United States Patent
Tifford et al.

(10) Patent No.: US 8,019,664 B1
(45) Date of Patent: Sep. 13, 2011

(54) SYSTEM AND METHOD FOR COMPLETING A FORM

(75) Inventors: Alan Tifford, San Diego, CA (US); Bennett R. Blank, San Diego, CA (US); Anthony Creed, San Diego, CA (US); Karla Julietta Uribe, San Diego, CA (US); Joel Kopelioff, San Diego, CA (US); Jason Casseday, San Diego, CA (US); Dave Curtis Barrett, Chula Vista, CA (US); Michelle M. Makowski, San Diego, CA (US)

(73) Assignee: Intuit Inc., Mountain View, CA (US)

( * ) Notice: Subject to any disclaimer, the term of this patent is extended or adjusted under 35 U.S.C. 154(b) by 277 days.

(21) Appl. No.: 12/251,288

(22) Filed: Oct. 14, 2008

(51) Int. Cl.
  *G06F 17/22* (2006.01)

(52) U.S. Cl. ............ 705/31; 705/30; 715/221; 715/222; 715/224; 715/225

(58) Field of Classification Search ............... None
See application file for complete search history.

(56) References Cited

U.S. PATENT DOCUMENTS

| | | | |
|---|---|---|---|
| 7,860,763 B1* | 12/2010 | Quinn et al. | 705/31 |
| 2004/0181749 A1* | 9/2004 | Chellapilla et al. | 715/505 |
| 2005/0102608 A1* | 5/2005 | Batres | 715/505 |
| 2008/0163342 A1* | 7/2008 | Christopherson | 726/4 |
| 2009/0165140 A1* | 6/2009 | Robinson et al. | 726/26 |
| 2009/0228380 A1* | 9/2009 | Evanitsky | 705/31 |
| 2009/0254358 A1* | 10/2009 | Li et al. | 705/1 |

OTHER PUBLICATIONS

"Tax-Help Software: Two Test Drives", Lim, Paul, The New York Times, Feb. 11, 2007, p. 3.*

* cited by examiner

*Primary Examiner* — M. Thein
(74) *Attorney, Agent, or Firm* — Osha • Liang LLP

(57) ABSTRACT

A method for completing a financial form by a user, including: generating a plurality of panels associated with a plurality of financial events reported by the financial form; obtaining a visual data item associated with the user and a financial event of the plurality of financial events; applying the visual data item to a panel of the plurality of panels, where the panel is associated with the financial event; capturing a financial value associated with the financial event using the panel; populating at least a portion of the financial form based on the financial value; extracting a key from a previously populated financial form associated with the user; and searching a visual data source based on the key, where the visual data item is located in the visual data source.

17 Claims, 5 Drawing Sheets

SYSTEM AND METHOD FOR COMPLETING A FORM

BACKGROUND

Organizations of all types (e.g., corporations, non-profit groups, academic institutions, government bodies, households, individuals, trusts, estates, etc.) are required to complete forms (e.g., financial forms). In some cases, it may only be necessary to complete these financial forms once during the life of the organization (e.g., incorporation forms, merger forms, employment application, etc.). In other cases, it may be necessary to complete these financial forms on a frequent basis (e.g., annual tax return, compliance forms, expense reports, etc.).

Financial forms are often used to report financial events to a financial body (e.g., a tax authority). A financial event is any activity that involves a financial transaction or that has a financial impact. Financial events may include, for example, earning wages through full and/or part time employment, trading stocks, bonds, mutual funds, commodities, currencies, and/or bullion, receiving royalties from intellectual property, mortgage payments, medical bills, student loan payments, getting married, having dependents, saving for retirement, paying insurance premiums, business expenses, making charitable donations, automobile payments, etc.

In some cases, a financial form may be used to report only a single financial event. In other cases, a financial form may be used to report multiple financial events. Financial forms may be any number of pages long and may be divided into multiple sections, with each section pertaining to one or more financial events. In many cases, financial forms may also be used to determine additional payments and/or credits that result from the reported financial events (e.g., tax bill, tax refund, etc.).

SUMMARY

In general, in one aspect, the invention relates to a method for completing a financial form associated with a user. The method includes generating a plurality of panels associated with a plurality of financial events reported by the financial form; obtaining a visual data item associated with the user and a financial event of the plurality of financial events; applying the visual data item to a panel of the plurality of panels, where the panel is associated with the financial event; capturing a financial value associated with the financial event using the panel; populating at least a portion of the financial form based on the financial value; extracting a key from a previously populated financial form associated with the user; and searching a visual data source based on the key, where the visual data item is located in the visual data source.

In general, in one aspect, the invention relates to a computer readable medium storing instructions for completing a financial form associated with a user. The instructions include functionality to generate a plurality of panels associated with a plurality of financial events reported by the financial form; obtain a visual data item associated with the user and a financial event of the plurality of financial events; apply the visual data item to a panel of the plurality of panels, where the panel is associated with the financial event; capture a financial value associated with the financial event using the panel; populating at least a portion of the financial form based on the financial value; extract a key from a previously populated financial form associated with the user; and search a visual data source based on the key, where the visual data item is located in the visual data source.

In general, in one aspect, the invention relates to a system for completing a financial form associated with a user. The system includes a form module configured to populate a portion of a financial form, where the financial form reports a plurality of financial events; a panel generator operatively connected to the form module and configured to generate a plurality of panels associated with the plurality of financial events prior to populating the portion of the financial form; and a customization module operatively connected to the panel generator and configured to obtain a plurality of visual data items associated with the user and the plurality of financial events, where the panel generator is further configured to apply a visual data item of the plurality of visual data item to one of the plurality of panels.

Other aspects of the invention will be apparent from the following description and the appended claims.

DETAILED DESCRIPTION

Figure 1:
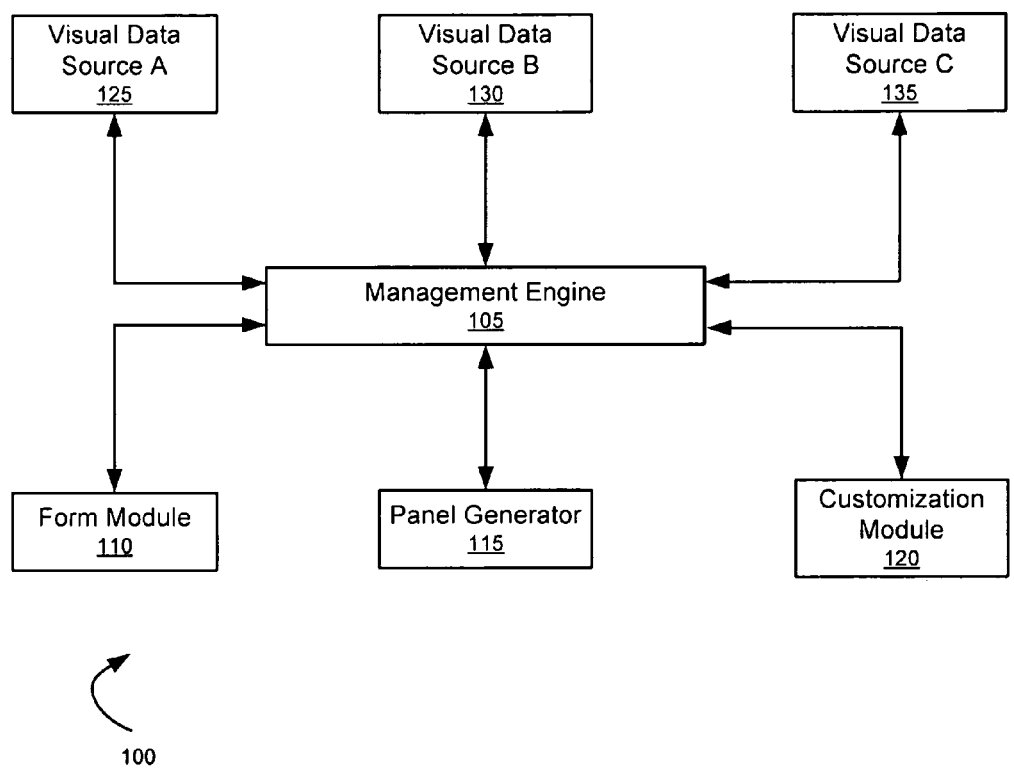
FIG. 1 shows a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a system and method to populate a financial form using panels. Specifically, the panels capture and display financial values for a financial event reported by the financial form. In order to customize a user's experience while completing the financial form, one or more visual data items associated with the user and a financial event are applied to each of the panels. These visual data items may be directly obtained from the user and/or from third-party websites. Further, these visual data items may be obtained based on previously populated financial forms associated with the user, interviews with the user, and/or data provided by the user during a current session or previous session of the system or method.

FIG. 1 shows a system (100) in accordance with one or more embodiments of the invention. As shown in FIG. 1, the system (100) has multiple components including a form module (110), a panel generator (115), a customization module (120), a management engine (105), and multiple visual data sources (i.e., Visual Data Source A (125), Visual Data Source B (130), Visual Data Source C (135)). Each of these components are described below and may be located on the same device (e.g., a server, mainframe, desktop personal computer (PC), laptop, personal digital assistant (PDA), television, cable box, satellite box, kiosk, telephone, mobile phone, etc.)

or may be located on separate devices connected by a network (e.g., the Internet), with wired and/or wireless segments.

As discussed above, a financial event is any activity that involves a financial transaction or that has a financial impact. Accordingly, financial events may include, for example, earning wages through full and/or part time employment, trading stocks, bonds, mutual funds, commodities, currencies, and/or bullion, receiving royalties from intellectual property, making mortgage payments, paying medical bills, making student loan payments, getting married or divorced, having dependents, saving for retirement, paying insurance premiums, making business expenses, making charitable donations, making automobile payments, paying property taxes, paying licensing fees, withholding federal and/or state income taxes, etc.

In one or more embodiments of the invention, the form module (110) is configured to manage financial forms reporting one or more financial events. These financial forms may be incorporation forms, merger forms, employment applications, tax returns, compliance forms, expense reports, etc. Further, these forms may be blank (i.e., not yet populated) or have portions previously populated by one or more users. The form module (110) includes a repository (e.g., a database) to store the financial forms and/or the form module (110) accesses an external repository (not shown) to store the financial forms. In one or more embodiments of the invention, the form module (110) is further configured to electronically transmit a financial form to a financial body (e.g., a tax authority).

In one of more embodiments of the invention, the form module (110) is used to populate a financial form. Specifically, the form module (110) permits a user direct access to the fields of the financial form and/or the form module (110) includes a set of mappings to map financial values obtained from other sources (e.g., GUI components on panels, discussed below) to the one or more fields of the financial form. Further, the form module (110) may convert obtained data into formats suitable for the fields of the financial form (e.g., date formats, currency formats, etc.).

In one or more embodiments of the invention, a panel is a visual element of any size and shape for capturing and displaying financial values (i.e., wages, taxes withheld, IRA contributions, share prices, interest payments, royalties received, etc.) associated with one or more financial events. Accordingly, a panel may include any number of graphical user interfaces (GUI) with textboxes, radio buttons, drop-down lists, checkboxes, labels, and other widgets known to those of ordinary skill in the art. Further, the financial values captured and displayed by a panel are relevant to the corresponding financial event. For example, a school loan panel may include text boxes to input tuition amounts and/or student loan interest payments. Similarly, an income panel may include text boxes to input wages. The captured and displayed financial values may eventually be used to populate the financial form reporting the one or more financial events.

In one or more embodiments of the invention, the panel generator (115) is configured to generate a panel in response to identifying a financial event reported by a financial form. For example, the panel generator (115) is configured to generate an income panel when it is identified that the financial form reports wages earned through employment. Similarly, the panel generator (115) is configured to generate a capital gains panel when it is identified that the financial form reports the trading of equities. Similar still, the panel generator (115) is configured to generate a real estate panel when it is identified that the financial form reports mortgage payments and/or property taxes. Those skilled in the art, having the benefit of this detailed description, will appreciate that many other types of panels may be generated based on the financial events reported by the financial form.

In one or more embodiments of the invention, each generated panel includes multiple layers to describe the financial event reported by the financial form. For example, a generated panel may include a primitive layer including a large number of GUI components for capturing and displaying data associated with the corresponding financial event. In one or more embodiments of the invention, the primitive layer may capture and display financial values with the same specificity as the fields of the financial form reporting the financial event. In contrast, a top layer of a generated panel includes fewer GUI components than the primitive level and captures only a high level view of the financial event. Those skilled in the art, having the benefit of this detailed description, will appreciate a generated panel may have any number of layers between the top layer and the primitive layer.

A visual data item is a visual element associated with both a financial event and a user of a financial form reporting the financial event. A visual data item may be a photograph, a video clip, an icon, an animation sequence, a map, an avatar, a slide show, a chart, a coat of arms associated with a school, a company logo, or any other type of visual component, static or dynamic in nature. In one or more embodiments of the invention, a generated panel is customized using one or more visual data items. Specifically, the panel generator (115) is configured to apply one or more visual data items to a panel, effectively customizing the appearance of the panel for the user of the financial form. A visual data item might only be applied to a top layer of a generated panel.

For example, a school loan panel may be customized by applying (e.g., displaying) a coat of arms associated with a school attended by or previously attended by the user to the school loan panel. Similarly, a capital gains panel may be customized by applying a chart showing the historical performance of an equity owned by the user to the capital gains panels. Those skilled in the art, having the benefit of this detailed description, will appreciate that many others examples of panel customization exist.

In one or more embodiments of the invention, the customization module (120) is configured to obtain visual data items for customizing the appearance of panels. The customization module (120) may obtain visual data items directly from a user of the financial form. For example, the customization module may obtain photographs of the user's family, home, automobile, place of employment, and/or other objects tied to financial events, directly from the user (i.e., during an interview of the user).

Alternatively, the customization module (120) may obtain visual data items by initially extracting one or more keys from a financial form previously populated by the user (e.g., an income tax return from a previous year), and then searching the visual data sources (125, 130, 135) for visual data items using the keys as search criteria. For example, the customization module (120) may extract zip codes, financial institution names, employer names, school names, and traded stocks from a previous income tax return. The customization module (120) may then obtain weather forecasts or maps associated with the extracted zip codes, logos associated with the extracted employer, logos associated with the extracted financial institution, a coat of arms associated with the extracted school, and historical performance or a real-time quote (e.g., a live feed) of the share price of the extracted stock. As yet another alternative, the one or more keys may be extracted from information provided by the user during a current or past session of the system (100). Those skilled in the art, having the benefit of this detailed description, will appreciate that there exists many other keys that can be extracted from a financial form or from the current or previous sessions of the system.

In one or more embodiments of the invention, the visual data sources (125, 130, 135) manage one or visual data items. Accordingly, the visual data sources (125, 130, 135) may be any type of repository (e.g., a database) storing visual data items of any format. Alternatively, the visual data sources (125, 130, 135) may include third-party websites. For example, one of the visual data sources (125, 130, 135) may be a social networking website where the user of the financial form maintains a profile and a visual data item is posted on said profile. As another example, one of the visual data sources (125, 130, 135) may be the website of a financial institution (i.e., a bank, credit union, brokerage firm, etc.) where the user maintains an account. Accordingly, the visual data item may be a logo of the financial institution, an account balance, a logo of the company in which the user owns shares, and/or charts showing the historical performance of shares owned by the user, depending what is available on the website (s). As an additional example, one of the visual data sources (125, 130, 135) may be the website of the user's employer or the user's school. Accordingly, the visual data item may be a logo of the user's employer or a coat of arms associated with the user's school available from the website. Further, one of the visual data sources (125, 130, 135) may include a user's electronic calendar.

In one or more embodiments of the invention, the visual data sources (125, 130, 135) include a weather forecast website and/or a map generating website. Accordingly, the visual data item may be a weather forecast for a zip code including a home owned by the user and/or the visual data item may include a map identifying the location of property owned by the user.

In one or more embodiments of the invention, the management engine (105) provides an interface to the visual data sources (125, 130, 135), the form module (110), the panel generator (115), and the customization module (120). The interface provided by the management engine (105) may include a graphical user interface (GUI) configured to accept inputs (e.g., keyboard input, cursor input, voice commands, etc.) from the user and produce outputs using a display screen, a printer, audio speakers, etc. The management engine (105) may direct the activities of the components in system (100) and translate data from the format of one component to the format of another component, as required.

In one or more embodiments of the invention, the management engine (105), the form module (110), the panel generator (115), and the customization module (120) are all modules in a financial software application (e.g., a tax preparation software application) running on a single PC or on a client/server environment.

Figure 2:
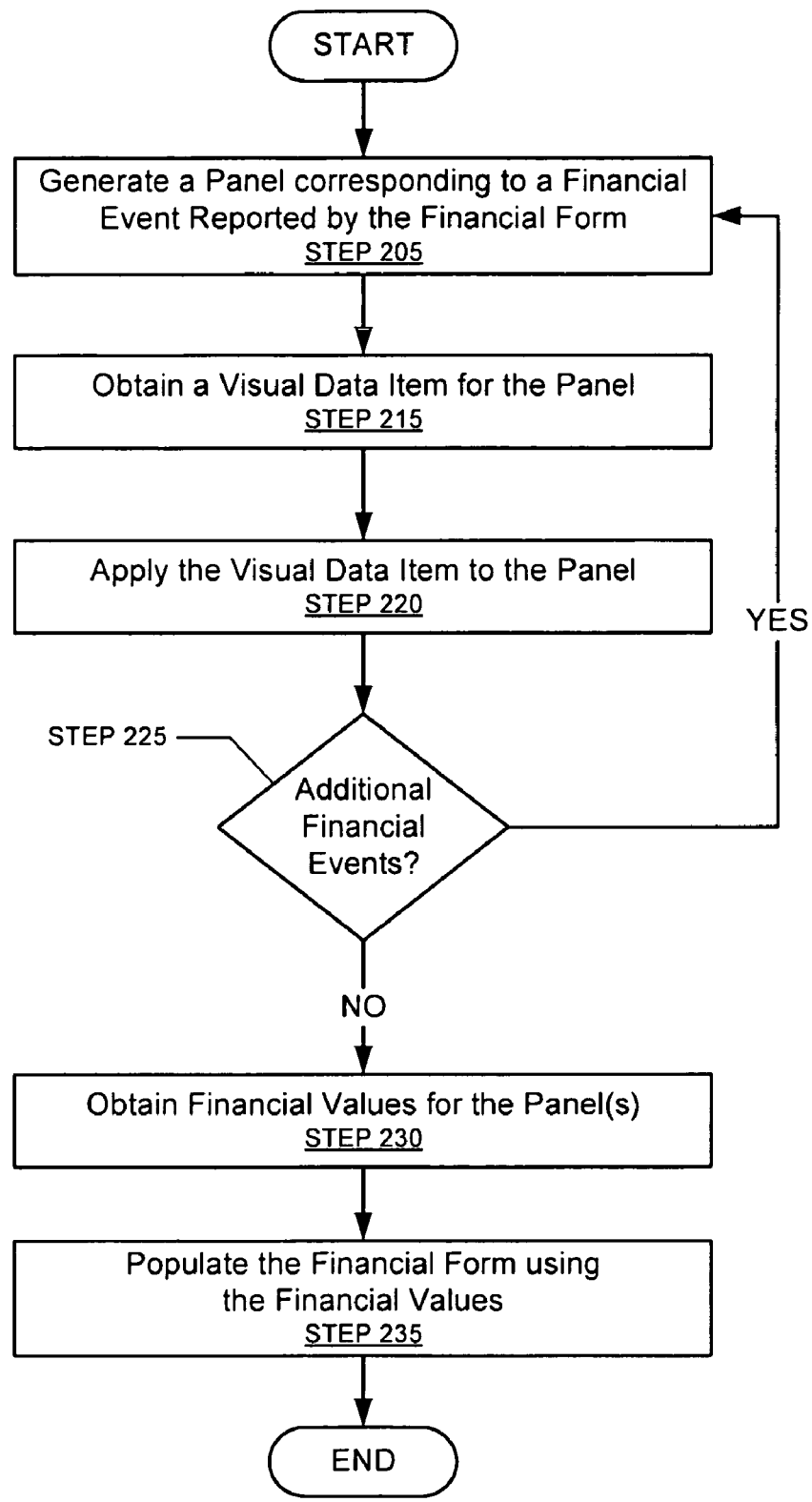
FIG. 2 shows a flowchart in accordance with one or more embodiments of the invention.

FIG. 2 shows a flowchart in accordance with one or more embodiments of the invention. The process shown in FIG. 2 may be used, for example, by the system (100) for customizing panels and completing at least a portion of a financial form using the panels. Those skilled in the art, having the benefit of this detailed description, will appreciate the sequence of steps shown in FIG. 2 may differ among embodiments of the invention, and that one or more of the steps may be optional.

Initially, a panel associated with a financial event is generated (STEP 205). In one or more embodiments of the invention, the panel is generated once a financial event reported by the financial form is identified. For example, an income panel is generated when it is identified that the financial form reports wages earned through employment. Similarly, a student loan panel is generated when it is identified that the financial form reports payments toward loans for tuition at academic institutions.

In STEP 215, a visual data item is obtained for the panel. As discussed above, a visual data item is associated with both a user of the financial form and the financial event linked to the generated panel. Further, a visual data item may include a photograph, a video clip, an icon, an animation, a map, an avatar, a slide show, a chart, a coat of arms associated with a school, a company logo, or any other type of visual component, static or dynamic in nature.

In one or more embodiments of the invention, the visual data item is obtained directly from the user during an interview. In other words the user may provide visual data items (e.g., photographs) when prompted. Alternatively, obtaining a visual data item for the panel may include extracting keys from a financial form that has been previously populated by the user, and then searching multiple visual data sources (e.g., third-party websites) based on the keys to obtain the visual data item. In other words, the visual data item may be available from one or more third-party websites and the extracted keys may be used as search criteria for finding the visual data items.

In STEP 220, the visual data item is applied to the panel. In one or more embodiments of the invention, applying the visual data item includes customizing the appearance of the panel using the visual data item. For example, the visual data item may act as a background image for the panel. Similarly, the visual data item may be displayed in only a portion of the panel. Alternatively, the visual data item may be a video clip the user can view on the panel and operate using buttons on the panel. Even further, the visual data item may be an avatar (i.e., a three dimensional model of the user) walking about a section of the panel.

Those skilled in the art, having the benefit of this detailed description, will appreciate the visual data item might not be rendered active until the user has selected the panel to be in focus. For example, in the case of an animation, the animation sequence may not be executed until the user is navigating the panel (discussed below).

In STEP 225, it is determined whether addition financial events are reported by the financial form. When it is determined that additional financial events are reported by the financial form, the process returns to STEP 205. When it is determined that all the financial events reported by the financial form have been identified, and thus the necessary panels are generated, the process proceeds to STEP 230.

In STEP 230, the financial values associated with the financial events of the financial form are captured using the corresponding panels. As discussed above, the panels may include one or more GUI interfaces for capturing and displaying financial values that are relevant to the corresponding financial events. Accordingly, a user may directly input financial values into the components of said GUI interfaces. Alternatively, a user may provide a source (e.g., a financial institution, a payroll system, etc.) from which the necessary financial values may be obtained. Further still, financial values may be obtained from previously populated financial forms (i.e., a previous tax return) and/or a financial software application (i.e., a tax preparation application, an accounting application, etc.).

In STEP 235, the financial form is populated using the captured financial values. In one or more embodiments of the invention, mapping rules are used to map captured financial values to one or more fields in the financial form. Once the financial form is populated, either in part or in whole, the financial form may be transmitted electronically to a financial authority (e.g., a tax authority).

Although the process described in FIG. 2 is focused heavily on the backend system, those skilled in the art, having the benefit of this detailed description, will appreciate that other embodiments of the invention may be focused heavily on the user perspective of said process. For example, instead of generating a panel and applying a visual data item to the panel (STEPS 205, 215, 220), the user obtains a panel after an appearance of said panel is customized using the visual data item. Similarly, instead of capturing financial values using the panels (STEP 230), the user navigates the layers of the panel and interacts with the GUI components to input the necessary financial values needed to populate the financial form. Similar still, instead of populating the financial form (STEP 235), the user may print, view, transmit, and/or store the financial form after it has been populated.

In one or more embodiments of the invention, once a panel is generated, the appearance of the panel may be updated at any time (not shown). In other words, new or updated visual data items may be applied to an existing panel at any time or after any time interval. The new/updated visual items may be identified from user data provided during the current invocation or a previous invocation of the process shown in FIG. 2 (e.g., STEP 230). For example, once a user has provided financial account information, one or more panels may be continuously updated to display direct feeds (i.e., stock prices, account balances, etc.) associated with the user's financial accounts.

Figure 3:
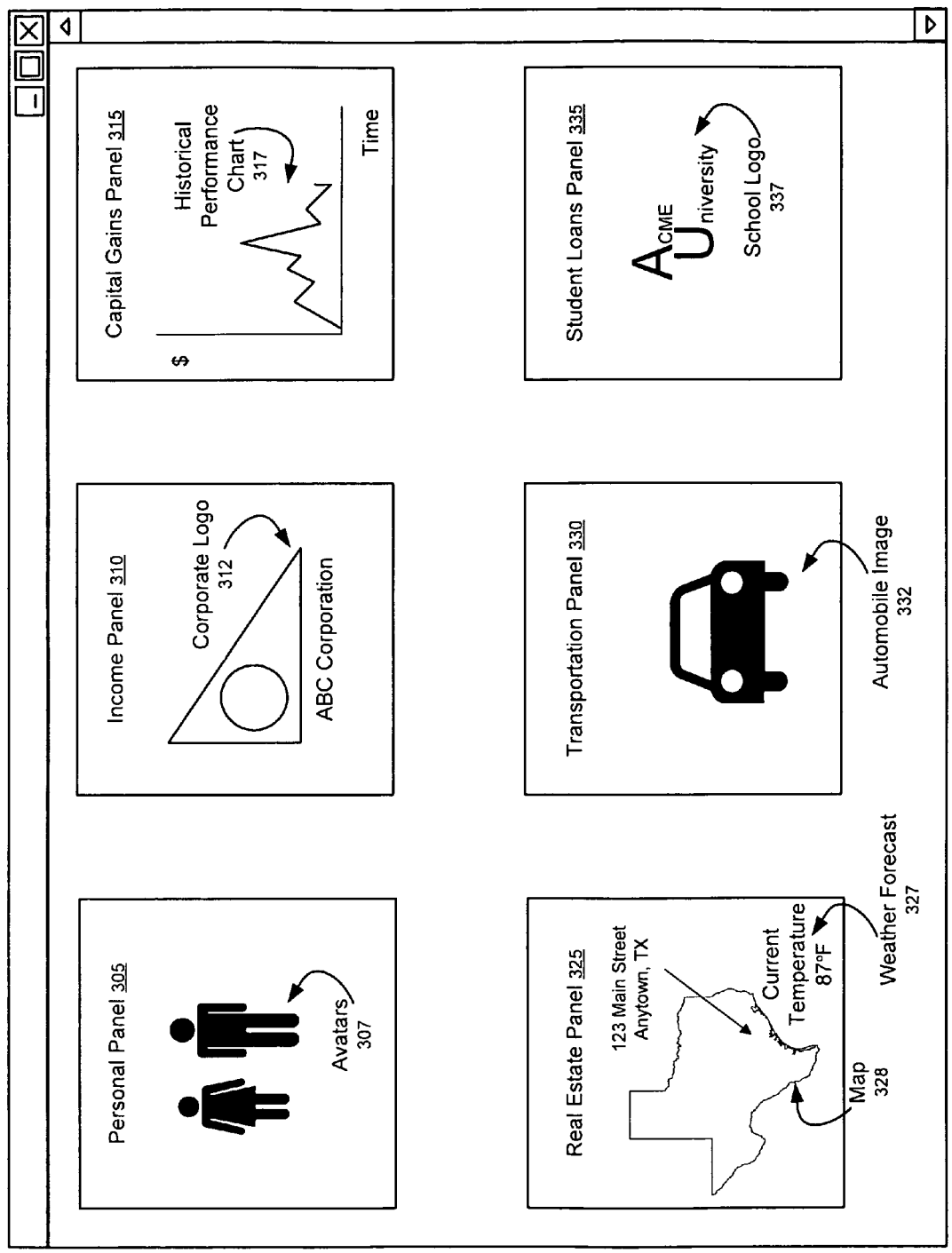
FIG. 3 and FIG. 4 show examples in accordance with one or more embodiments of the invention.

FIG. 3 shows an example in accordance with one or more embodiments of the invention. As shown in FIG. 3, multiple panels have been generated including a personal panel (305), an income panel (310), a capital gains panel (315), a real estate panel (325), a transportation panel (330), and a student loans panel (335). In the example, each of the panels is associated with a financial event reported by a federal income tax return. Further, each of the panels was generated after identifying the one or more financial events reported by the federal income tax return.

In the example, the personal panel (305) is associated with dependent information, marriage information, and other personal information (e.g., birthdates, social security numbers, disabilities, etc.) reported by the federal income tax form. The income panel (310) is associated with wages, tips, commissions, and other income reported by the federal income tax return. The capital gains panel (315) is associated with capital gains, capital losses, dividends, stock options, and similar asset types reported by the federal income tax return. The real estate panel (325) is associated with mortgage interest payments, property taxes, home renovation costs, etc. reported by the federal income tax return. The transportation panel (330) is associated with car payments, car registration fees, license fees, car sales, etc. reported by the federal income tax return. The student loans panel (335) is associated with student loan payments and tuition amounts etc. reported by the federal income tax return.

As also shown in FIG. 3, one or more visual data items have been applied to the panels. In the example, avatars (307) are applied to the personal panel (305). The avatars (307) are uploaded by a user and move around the personal panel (305) while the user is navigating the personal panel (305). Similarly, a corporate logo (312) is applied to the income panel (310). The corporate logo (312) is downloaded from the website of the user's employer. In addition, a historical performance chart (317) is applied to the capital gains panel (315). The historical performance chart (317) is obtained from a website tracking stocks owned by the user. Alternatively, the performance chart (317) may be one of many slides in a slide show reporting the performance of the user's multiple investments.

Still referring to FIG. 3, a map (328) and a weather forecast (327) are applied to the real estate panel (325), and identify the location of property owned by the user and the current temperature near said location, respectively. Further, an automobile image (332) is applied to the transportation panel (330). The automobile image (332) is a search result following an internet search for the user's car. Finally, a school logo (337) is applied to the student loans panel (335). The school logo (337) is obtained from a website with information on the school attended by or previously attended by the user.

Still referring to FIG. 3, the multiple panels (305, 310, 315, 325, 330, 335) are used to capture and display data associated with the corresponding financial events. The user inputs financial data into each of the panels (305, 310, 315, 325, 330, 335) by navigating the multiple layers of said panels. Alternatively, financial data is obtained from previously populated financial forms (e.g., a previous year federal tax return), financial institutions (e.g., banks, brokerages, credit unions, etc.) where the user holds an account, and/or financial software application (e.g., tax preparation software, accounting software, etc.).

Figure 4:
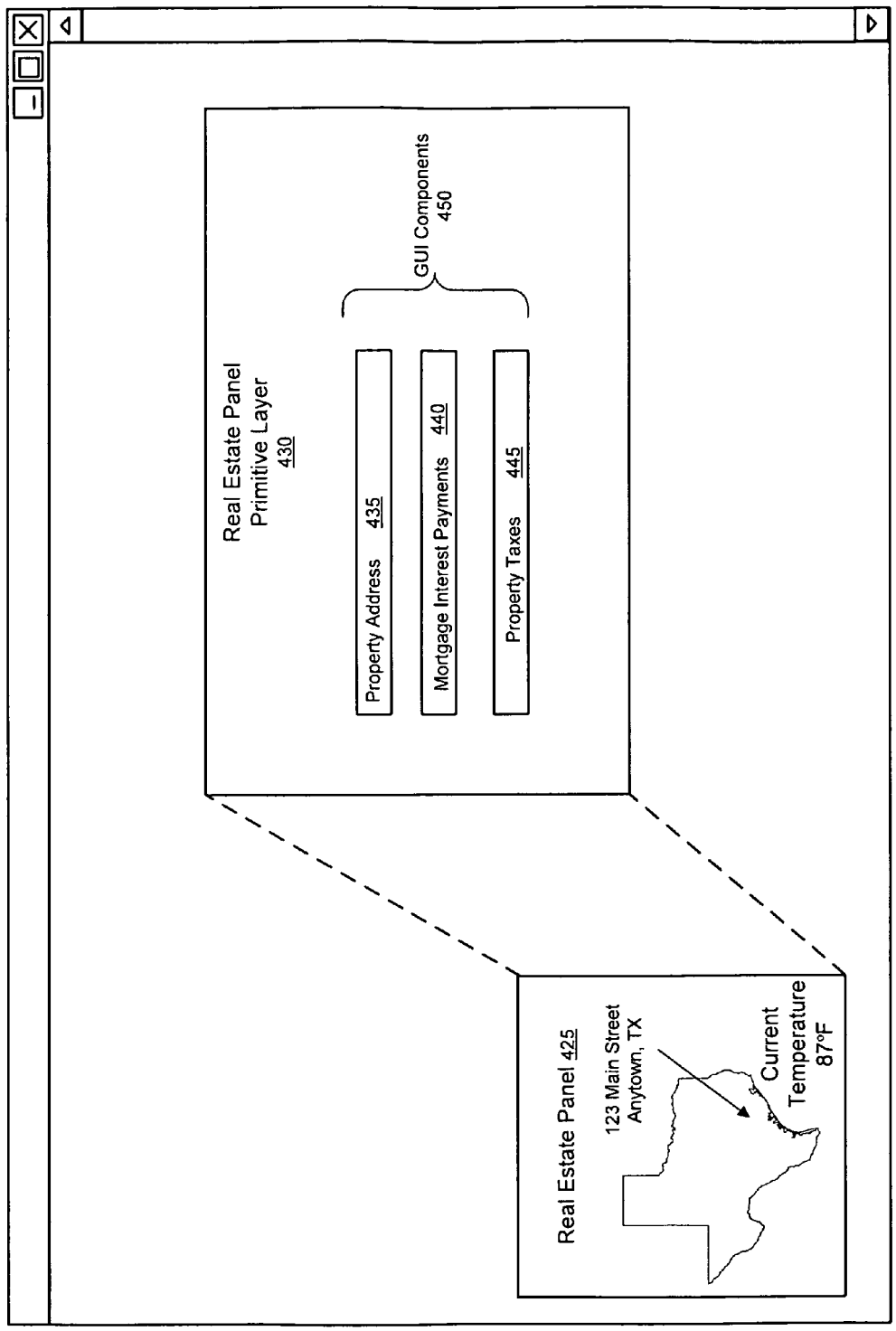

FIG. 4 shows an example in accordance with one or more embodiments of the invention. As shown in FIG. 4, the example includes a real estate panel (425) and a primitive layer of the real estate panel (430). The real estate panel (425) is essentially the same as the real estate panel (325), discussed above in reference to FIG. 3.

As shown in FIG. 4, the primitive layer (430) of the real estate panel (425) includes multiple GUI components (450) including a property address textbox (435), a mortgage interest payment textbox (440), and a property taxes textbox (445). The GUI components (450) are directly mapped to fields on the financial form reporting the real estate financial events (e.g., federal tax return). In other words, the values inputted into the GUI components (450) are used to populate at least a portion of the federal tax return.

Those skilled in the art, having the benefit of this detailed description, will appreciate that one or more of the panels shown in FIG. 3 have primitive layers similar to that of the real estate panel primitive layer (430). In other words, the one or more panels shown in FIG. 3 also have primitive layers with GUI components that are accessible to the user. The values inputted into said GUI components may be used to populate the financial form.

Although the mentioned embodiments of the invention have focused heavily on financial forms, those skilled in the art, having the benefit of this detailed description, will appreciate that other embodiments of the invention may be used to complete any type of form (e g , immigration forms, concert ticket forms, legal forms, etc.) that depends wholly or in part on multiple data sources for completion, in addition to user input.

Figure 5:
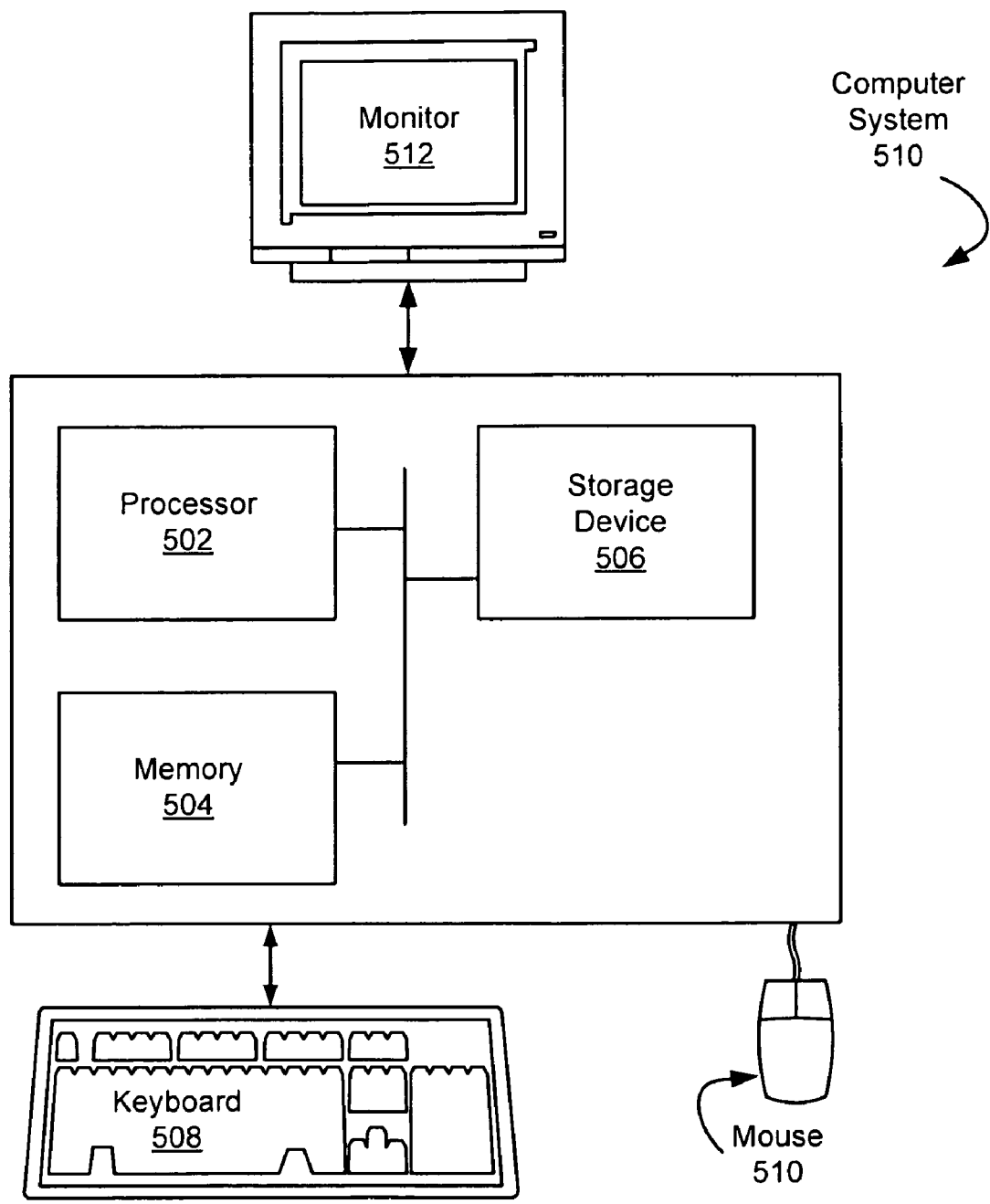
FIG. 5 shows a computer system in accordance with one embodiment of the invention.

The invention may be implemented on virtually any type of computer regardless of the platform being used. For example, as shown in FIG. 5, a computer system (500) includes a processor (502), associated memory (504), a storage device (506), and numerous other elements and functionalities typical of today's computers (not shown). The computer (500) may also include input means, such as a keyboard (508) and a mouse (510), and output means, such as a monitor (512). The computer system (500) is connected to a local area network (LAN) or a wide area network (e.g., the Internet) (not shown) via a network interface connection (not shown).

Those skilled in the art will appreciate that these input and output means may take other forms.

Further, those skilled in the art will appreciate that one or more elements of the aforementioned computer system (500) may be located at a remote location and connected to the other elements over a network. Further, the invention may be implemented on a distributed system having a plurality of nodes, where each portion of the invention (e.g., form module (110), panel generator (115), and customization module (120), etc.) may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for completing a tax return by a user, comprising:
   generating, using a hardware processor, a plurality of panels associated with a plurality of financial events reported by the tax return;
   extracting, using the hardware processor, an alphanumeric key from a previously filed tax return associated with the user and a financial event of the plurality of financial events;
   searching online, using the alphanumeric key as a search criterion, for a visual data item associated with the user and the financial event;
   obtaining, using the hardware processor, the visual data item from a webpage;
   applying, using the hardware processor, the visual data item to a panel of the plurality of panels, wherein the panel is associated with the financial event;
   displaying, using the hardware processor, the panel to the user after applying the visual data item to the panel, wherein the user inputs a financial value into a component of the panel;
   capturing, using the hardware processor, the financial value associated with the financial event from the component of the panel; and
   populating, using the hardware processor, at least a portion of the tax return reporting the financial event based on the financial value.

2. The method of claim 1, wherein the visual data item is an avatar associated with the user.

3. The method of claim 1, wherein the visual data item is a map identifying real estate of the user.

4. The method of claim 1, wherein the visual data item is a weather forecast for a location associated with the user.

5. The method of claim 1, wherein the webpage is located on a social networking website accessed by the user, and wherein the visual data item is posted on the webpage.

6. The method of claim 1, wherein the webpage is located on a website of an employer of the user, and wherein the visual data item is posted on the webpage.

7. The method of claim 1, wherein the visual data item is a slide show of asset performance, and wherein obtaining the visual data item comprises accessing a brokerage account of the user.

8. The method of claim 1, wherein the financial value is captured from a financial software application.

9. A computer readable medium storing instructions for completing a financial form associated with a user, the instructions executable on a hardware processor and comprising functionality to:
   generate a plurality of panels associated with a plurality of financial events reported by the financial tax return;
   extract an alphanumeric key from a previously populated financial tax return associated with the user and a financial event of the plurality of financial events;
   search online, using the alphanumeric key as a search criterion, for a visual data item associated with the user and the financial event;
   obtain the visual data item from a webpage;
   apply the visual data item to a panel of the plurality of panels, wherein the panel is associated with the financial event;
   display, after the visual data item is applied to the panel, the panel to the user, wherein the user inputs a financial value into a component of the panel;
   capture the financial value associated with the financial event from the component of the panel;
   populate at least a portion of the tax return reporting the financial event based on the financial value.

10. The computer readable medium of claim 9, wherein the visual data item is an avatar associated with the user.

11. The computer readable medium of claim 9, wherein the webpage is located on a website of an employer of the user, and wherein the visual data item is posted on the webpage.

12. The computer readable medium of claim 9, wherein the visual data is a slide show of asset performance, and wherein the instructions to obtain the visual data comprise functionality to access a brokerage account of the user.

13. A system for completing a tax return by a user, comprising:
   a hardware processor;
   a form module executing on the hardware processor and configured to populate a portion of a tax return, wherein the tax return reports a plurality of financial events;
   a panel generator, executing on the hardware processor, operatively connected to the form module, and configured to generate a plurality of panels associated with the plurality of financial events before the portion of the tax return is populated; and
   a customization module, executing on the hardware processor, operatively connected to the panel generator, and configured to:
      extract an alphanumeric key from a previously filed tax return associated with the user and a financial event of the plurality of financial events,
      search online, using the alphanumeric key as a search criterion, for a visual data item associated with the user and the financial event of the plurality of financial events, and
      obtain the visual data item from a webpage,
   wherein the panel generator is further configured to apply the visual data item to a panel of the plurality of panels,
   wherein the panel comprises a component and is presented to the user after the visual data item is applied to the panel,
   wherein the user inputs a financial value into the component of the panel, and wherein the portion of the tax return is populated based on the financial value.

14. The system of claim 13, wherein the panel generator is associated with a financial software application.

15. The system of claim 13, wherein the webpage is located on a social networking website accessed by the user, and wherein the visual data item is extracted from the webpage.

16. The system of claim 13, wherein the visual data item is a slide show of asset performance, and wherein the customization module is configured to access a brokerage account of the user to obtain the slide show.

17. The system of claim 13, wherein the visual data item is at least one selected from a group consisting of an avatar associated with the user, a weather forecast for a location associated with the user, a map identifying real estate of the user, a logo associated with an employer of the user, and a logo associated with a school of the user.

* * * * *

UNITED STATES PATENT AND TRADEMARK OFFICE
CERTIFICATE OF CORRECTION

| | |
|---|---|
| PATENT NO. | : 8,019,664 B1 |
| APPLICATION NO. | : 12/251288 |
| DATED | : September 13, 2011 |
| INVENTOR(S) | : Alan Tifford et al. |

It is certified that error appears in the above-identified patent and that said Letters Patent is hereby corrected as shown below:

In Claim 9, Column 10 (line 27), --and-- should be added after "panel;".

Signed and Sealed this
Eighth Day of November, 2011

David J. Kappos
*Director of the United States Patent and Trademark Office*